United States Patent
Peng et al.

(10) Patent No.: US 10,266,718 B2
(45) Date of Patent: Apr. 23, 2019

(54) PROTECTIVE MATERIAL AND PROTECTIVE STRUCTURE AND PROTECTIVE METHOD

(71) Applicant: INDUSTRIAL TECHNOLOGY RESEARCH INSTITUTE, Chutung, Hsinchu (TW)

(72) Inventors: Chih-Kang Peng, Toufen (TW); Wei-Hao Lai, Kaohsiung (TW); Shih-Ming Chen, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 307 days.

(21) Appl. No.: 15/063,746

(22) Filed: Mar. 8, 2016

(65) Prior Publication Data

US 2017/0174930 A1    Jun. 22, 2017

(30) Foreign Application Priority Data

Dec. 17, 2015 (TW) .............................. 104142430 A

(51) Int. Cl.
| | |
|---|---|
| *C09D 133/24* | (2006.01) |
| *C08K 3/36* | (2006.01) |
| *F41H 5/06* | (2006.01) |
| *C09D 5/00* | (2006.01) |
| *F41H 5/02* | (2006.01) |
| *C09D 7/61* | (2018.01) |

(52) U.S. Cl.
CPC .............. *C09D 133/24* (2013.01); *C08K 3/36* (2013.01); *C09D 5/00* (2013.01); *C09D 7/61* (2018.01); *F41H 5/02* (2013.01); *F41H 5/06* (2013.01)

(58) Field of Classification Search
CPC .................................................. C09D 133/24
USPC ....................................................... 428/323
See application file for complete search history.

(56) References Cited

U.S. PATENT DOCUMENTS

| | | | |
|---|---|---|---|
| 5,725,911 A * | 3/1998 | Tsuneta ..................... C23C 4/02 | |
| | | | 427/405 |
| 6,511,756 B1 | 1/2003 | Obuchi et al. | |
| 7,226,878 B2 | 6/2007 | Wagner et al. | |
| 7,825,045 B1 | 11/2010 | Wagner et al. | |
| 8,783,185 B2 | 7/2014 | Jacobsen et al. | |
| 2005/0004318 A1 | 1/2005 | Ohshiro et al. | |
| 2007/0197676 A1* | 8/2007 | Litke ......................... C09D 4/00 | |
| | | | 522/46 |
| 2013/0261208 A1 | 10/2013 | Borges De Couraca et al. | |
| 2015/0126631 A1 | 5/2015 | Bruno et al. | |

FOREIGN PATENT DOCUMENTS

| | | |
|---|---|---|
| CN | 101001926 A | 7/2007 |
| CN | 101140151 A | 3/2008 |
| CN | 102382797 A | 3/2012 |
| CN | 102587039 A | 7/2012 |
| CN | 102926211 A | 2/2013 |
| CN | 103422341 A | 12/2013 |
| CN | 104213322 A | 12/2014 |
| CN | 104327795 A | 2/2015 |
| EP | 0427107 A2 | 5/1991 |
| TW | 333537 | 6/1998 |
| TW | 337489 | 8/1998 |
| TW | 200400226 A | 1/2004 |
| TW | 200936841 A | 9/2009 |
| TW | 201213120 A1 | 4/2012 |
| TW | 201439143 A | 10/2014 |
| TW | 201510135 A | 3/2015 |
| WO | WO 2006/064139 A1 | 6/2006 |
| WO | WO 2011/041540 A1 | 4/2011 |
| WO | WO 2012/103088 A2 | 8/2012 |

OTHER PUBLICATIONS

Taiwanese Office Action and Search Report for Taiwanese Application No. 104142430, dated Sep. 10, 2016.
Galindo-Rosales et al., "An apparent viscosity function for shear thickening fluids", Journal of Non-Newtonian Fluid Mechanics, 2011, vol. 166, pp. 321-325.
Haraguchi et al., "Compositional Effects on Mechanical Properties of Nanocomposite Hydrogels Composed of Poly(N,N-dimethylacrylamide) and Clay", Macromolecules, 2003, vol. 36, pp. 5732-5741.
Hassan et al., "Sonochemical synthesis and rheological properties of shear thickening silica dispersions", Ultrasonics Sonochemistry, 2010, vol. 17, pp. 947-952.
Lee et al. "The ballistic impact characteristics of Kevlar woven fabrics impregnated with a colloidal shear thickening fluid", Journal of Materials Science, 2003, vol. 38, pp. 2825-2833.

(Continued)

*Primary Examiner* — Doris L Lee

(74) *Attorney, Agent, or Firm* — Birch, Stewart, Kolasch & Birch, LLP

(57) ABSTRACT

A protective material is provided, which includes a polymer polymerized from a monomer and a plurality of silica particles. The monomer includes acrylamide with a formula of

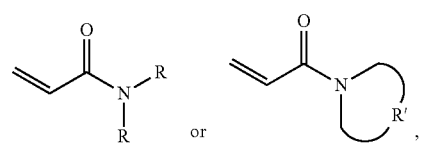

wherein each R is independently H or $C_{1-3}$ alkyl group, and R' is $C_{2-5}$ alkylene group. The silica particles and the polymer have a weight ratio of 1.5:1 to 4:1.

20 Claims, No Drawings

(56) References Cited

OTHER PUBLICATIONS

Lin et al. "The Mechanism of Shear Thickening Fluid With Nanoparticles Applied to Liquid Armor", Journal of C.C.I.T, May 2008, vol. 36, No. 2, pp. 1-6.
Lin et al., "Large Strain and Fracture Properties of Poly(dimethylacrylamide)/Silica Hybrid Hydrogels", Macromolecules, 2010, vol. 43, pp. 2554-2563.
Wagner et al., "Shear thickening in colloidal dispersions", Physics Today, Oct. 2009, pp. 27-32.
Taiwanese Office Action and Search Report, dated Jun. 21, 2017, for Taiwanese Application No. 105140373.
Taiwanese Notice of Allowance and Search Report for Taiwanese Application No. 105140215, dated Feb. 17, 2017.
Chinese Office Action and Search Report for Chinese Application No. 201510976067.3, dated Jul. 31, 2018.
Yang et al., "Research Progress in Shear-Thickening Fluids and Its Application in Body Protection," China Plastics, vol. 27, No. 9, Sep. 2013, pp. 1-5, with English abstract.
Zhang et al., "Shear Thickening Behavior of Polymer Solution and its Mechanism and Application," China Academic Journal Electronic Publishing House, Jun. 15, 2012, pp. 1-9, with English abstract.
Zheng et al., "Research and Application Progress of Silica Particles in Shear Thickening Liquid," China Academic Journal Electronic Publishing House, Oct. 25, 2009, pp. 132-136.

* cited by examiner

PROTECTIVE MATERIAL AND PROTECTIVE STRUCTURE AND PROTECTIVE METHOD

CROSS REFERENCE TO RELATED APPLICATIONS

The present application is based on, and claims priority from, Taiwan Application Serial Number 104142430, filed on Dec. 17, 2015, the disclosure of which is hereby incorporated by reference herein in its entirety

TECHNICAL FIELD

The technical field relates to a protective material, a protective structure and an application thereof.

BACKGROUND

A phenomenon known as shear thickening is normally present in a general suspension fluid. Previous research has mainly focused on preventing production equipment from being damaged by sudden shear thickening. In recent years, the shear thickening phenomenon has become understood further thanks to the development of the colloid science, and this knowledge has been utilized in research into protective applications.

A shear thickening material can be applied in impact resistant and protective equipment. It may instantly absorb energy to become hardened and to provide protection under high-speed impact. When the energy is released, the shear thickening material may recover its original state (e.g. a moldable state)

Accordingly, developments of the shear thickening formulation with a faster shear thickening rate or a higher protective effect and protection equipment utilizing the same are important topics.

SUMMARY

One embodiment of the disclosure provides a protective material, comprising: a polymer polymerized from a monomer, wherein the monomer includes acrylamide monomer with a formula of

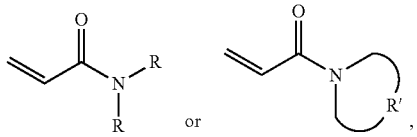

wherein each R is independently H or $C_{1-3}$ alkyl group, and R' is $C_{2-5}$ alkylene group; and a plurality of silica particles, wherein the silica particles and the polymer have a weight ratio of 1.5:1 to 4:1.

One embodiment of the disclosure provides a protective structure, comprising: a protective material; and a substrate impregnated in the protective material or disposed under the protective material; wherein the protective material comprises: a polymer polymerized from a monomer, wherein the monomer includes acrylamide monomer with a formula of

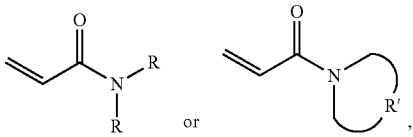

wherein each R is independently H or $C_{1-3}$ alkyl group, and R' is $C_{2-5}$ alkylene group; and a plurality of silica particles, wherein the silica particles and the polymer have a weight ratio of 1.5:1 to 4:1.

One embodiment of the disclosure provides a protective method, comprising: putting a protective structure on an object for dissipating a force in the protective material, wherein the force is initially applied to the object, wherein the protective structure comprises: a protective material; and a substrate impregnated in the protective material or disposed under the protective material; wherein the protective material comprises: a polymer polymerized from a monomer, wherein the monomer includes acrylamide monomer with a formula of

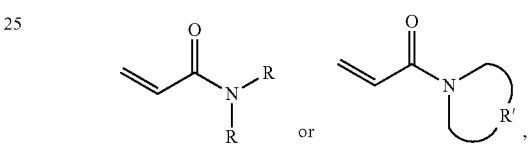

wherein each R is independently H or $C_{1-3}$ alkyl group, and R' is $C_{2-5}$ alkylene group; and a plurality of silica particles, wherein the silica particles and the polymer have a weight ratio of 1.5:1 to 4:1.

A detailed description is given in the following embodiments.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details.

One embodiment provides a protective material, comprising: a polymer polymerized from a monomer, wherein the monomer includes acrylamide monomer with a formula of

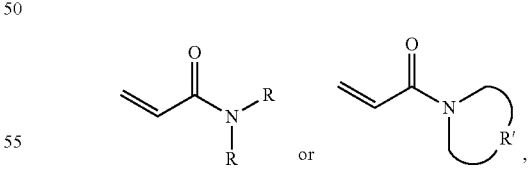

wherein each R is independently H or $C_{1-3}$ alkyl group, and R' is $C_{2-5}$ alkylene group; and a plurality of silica particles. In one embodiment, the silica particles and the polymer have a weight ratio of about 1.5:1 to 4:1. Too many silica particles may form a bulk solid which cannot flow. Too few silica particles cannot form a liquid with a shear thickening effect.

In one embodiment, the polymer has a weight average molecular weight (Mw) of about 1000 to 50000, or about 5000 to 20000. A polymer with an overly low Mw will make the protective material be thicker for a similar protective effect. The Mw of the polymer can be measured by following steps. 0.5 g of a cured sample was dissolved and stirred in 5 mL of tetrahydron furan (THF). The THF solution was filtered by a filtering film with a pore size of 0.45 μm, then filtered by a filtering film with a pore size of 0.22 μm, and then analyzed by a liquid chromatography analyzer (WATERS HIGH PERFORMANCE GPC SYSTEM) to measure the Mw of the polymer in the filtrate.

In one embodiment, the monomer of the polymer may further include acrylate monomer or acrylate oligomer, such as urethane diacrylate oligomer, isooctyl acrylate (such as 2-ethylhexyl acrylate), hydroxyethyl acrylate, or the like. The acrylamide monomer and the acrylate monomer (or acrylate oligomer) have a weight ratio about greater than or equal to 2.5. An overly low ratio of the acrylamide monomer cannot form a shear thickening fluid. In one embodiment, the silica particles are ball-shaped or irregular shaped. On the other hand, if the silica particles are replaced with other inorganic fillers, such as clay, alumina, or aluminum hydroxide, the composite will not have enough protective function. In one embodiment, the silica particles have a size of about 50 nm to 1 mm.

The protective material can be collocated with a substrate to form a protective structure. For example, the substrate can be impregnated in a shear thickening fluid (STF). The shear thickening fluid (STF) can includes the monomer of the polymer, an initiator, and the silica particles. Then heat the shear thickening fluid (STF) to cure the monomer to form a shear thickening gel (STG). As such, the substrate is impregnated in the STG to form the protective structure. In one embodiment, the STF can be put on the substrate and then cure STF to form the STG on the substrate. Alternatively, the STF can be directly cured to form the STG, and then put on the substrate. The substrate can be fiber, foam, coating, or metal foil. In one embodiment, the protective structure has a thickness of about 1 mm to 5 mm, which is thinner than that of conventional protective structures (7 mm to 14 mm).

The protective structure can be put onto an object, such that a force applied onto the object having the protective structure will dissipate in the protective structure. When the object is a human body and the force applied to the object comes from a bullet fired from a firearm, the protective structure can be so-called bulletproof cloth. In addition, the protective structure can be utilized in sports padding, battery shells, shoe pads, and the like. The protective structure can be applied to any object if necessary, and is not limited to the above applications.

Below, exemplary embodiments will be described in detail so as to be easily realized by a person having ordinary knowledge in the art. The inventive concept may be embodied in various forms without being limited to the exemplary embodiments set forth herein. Descriptions of well-known parts are omitted for clarity, and like reference numerals refer to like elements throughout.

EXAMPLES

Example 1

10.0 g of silica with a diameter of 2 to 3 μm (Megasil 550 silica, commercially available from Sibelco Asia Pte Ltd.-Bao Lin Branch) and 6.0 g of N,N-dimethyl acrylamide (DMAA, CAS#2680-03-7, commercially available from Houchi Chemical Co., Ltd) were stirred at room temperature for 3 hours to obtain a shear thickening fluid. The shear thickening fluid had an initial viscosity of 122251 cps at 25° C., and a maximum viscosity of 345711 cps at a shear rate of 3.11 s$^{-1}$. The shear thickening fluid was heated to 55° C. 1 phr of a thermal initiator AIBN (on the basis of DMAA) was then added to the shear thickening fluid, and the shear thickening fluid was then heated to 90° C. and reacted at 90° C. for 1 hour to polymerize the DMAA. The product of the reaction was poured on an aluminum plate with a diameter of 7.56 mm, and then cooled to form a sample. The sample was tested by an impact test of BS EN 1621-1 standard, and the residual pressure after the impact test was evaluated by a Fuji Prescale MW pressure sensing paper (Model: MS, single sheet, Commercially available from MassTech Inc). The composition and the impact test result of the sample (protective material) are shown in Table 1.

Example 2

12.0 g of silica with a diameter of 2 to 3 μm (Megasil 550 silica, commercially available from Asia Pte Ltd.-Bao Lin Branch) and 6.0 g of DMAA were stirred at room temperature for 3 hours to obtain a shear thickening fluid. The shear thickening fluid had an initial viscosity of 33534 cps at 25° C., and a maximum viscosity of 386624 cps at a shear rate of 3.11 s$^{-1}$. The shear thickening fluid was heated to 55° C. 1 phr of a thermal initiator AIBN (on the basis of DMAA) was then added to the shear thickening fluid, and the shear thickening fluid was then heated to 90° C. and reacted at 90° C. for 1 hour to polymerize the DMAA. The product of the reaction was poured on an aluminum plate with a diameter of 7.56 mm, and then cooled to form a sample. The sample was tested by an impact test of BS EN 1621-1 standard, and the residual pressure after the impact test was evaluated by a Fuji Prescale MW pressure sensing paper (Model: MS, single sheet, Commercially available from MassTech Inc). The composition and the impact test result of the sample (protective material) are shown in Table 1.

Example 3

13.5 g of silica with a diameter of 2 to 3 μm (Megasil 550 silica, commercially available from Asia Pte Ltd.-Bao Lin Branch) and 6.0 g of DMAA were stirred at room temperature for 3 hours to obtain a shear thickening fluid. The shear thickening fluid had an initial viscosity of 169641 cps at 25° C., and a maximum viscosity of 429582 cps at a shear rate of 3.11 s$^{-1}$. The shear thickening fluid was heated to 55° C. 1 phr of a thermal initiator AIBN (on the basis of DMAA) was then added to the shear thickening fluid, and the shear thickening fluid was then heated to 90° C. and reacted at 90° C. for 1 hour to polymerize the DMAA. The product of the reaction was poured on an aluminum plate with a diameter of 7.56 mm, and then cooled to form a sample. The sample was tested by an impact test of BS EN 1621-1 standard, and the residual pressure after the impact test was evaluated by a Fuji Prescale MW pressure sensing paper (Model: MS, single sheet, Commercially available from MassTech Inc). The composition and the impact test result of the sample (protective material) are shown in Table 1.

Example 4

24.0 g of silica with a diameter of 2 to 3 μm (Megasil 550 silica, commercially available from Asia Pte Ltd.-Bao Lin Branch) and 12.0 g of DMAA were stirred at room temperature for 3 hours to obtain a shear thickening fluid. The shear thickening fluid had an initial viscosity of 33534 cps at 25° C., and a maximum viscosity of 386624 cps at a shear rate of 3.11 s$^{-1}$. The shear thickening fluid was heated to 55°

C. 1 phr of a thermal initiator AIBN (on the basis of DMAA) was then added to the shear thickening fluid, and the shear thickening fluid was then heated to 90° C. and reacted at 90° C. for 1 hour to polymerize the DMAA. The product of the reaction was poured on an aluminum plate with a diameter of 7.56 mm, and then cooled to form a sample. The sample was tested by an impact test of BS EN 1621-1 standard, and the residual pressure after the impact test was evaluated by a Fuji Prescale MW pressure sensing paper (Model: MS, single sheet, Commercially available from MassTech Inc). The composition and the impact test result of the sample (protective material) are shown in Table 1.

Comparative Example 1

7.2 g of silica with a diameter of 2 to 3 μm (Megasil 550 silica, commercially available from Asia Pte Ltd.-Bao Lin Branch) and 6.0 g of DMAA were stirred at room temperature for 3 hours to obtain a fluid. The fluid was free of any shear thickening property. The fluid was heated to 55° C. 1 phr of a thermal initiator AIBN (on the basis of DMAA) was then added to the fluid, and the fluid was then heated to 90° C. and reacted at 90° C. for 1 hour to polymerize the DMAA. The product of the reaction was poured on an aluminum plate with a diameter of 7.56 mm, and then cooled to form a sample. The sample was tested by an impact test of BS EN 1621-1 standard, and the residual pressure after the impact test was evaluated by a Fuji Prescale MW pressure sensing paper (Model: MS, single sheet, Commercially available from MassTech Inc). The composition and the impact test result of the sample (protective material) are shown in Table 1.

Comparative Example 2

6.0 g of nanoclay with a diameter of 25 nm and a thickness of 0.92 nm (Laponite RD clay, commercially available from Rockwood Co.) and 35.29 g of DMAA were stirred at room temperature for 3 hours to obtain a fluid. The fluid was free of any shear thickening property. The fluid was heated to 55° C. 1 phr of a thermal initiator AIBN (on the basis of DMAA) was then added to the fluid, and the fluid was then heated to 90° C. and reacted at 90° C. for 1 hour to polymerize the DMAA. The product of the reaction was poured on an aluminum plate with a diameter of 7.56 mm. Because the product was not a shear thickening gel (STG), the impact test could not be performed. The composition of the product is shown in Table 1.

Comparative Example 3

12.0 g of nanoclay with a diameter of 25 nm and a thickness of 0.92 nm (Laponite RD clay, commercially available from Rockwood Co.) and 6.0 g of DMAA were stirred at room temperature for 3 hours to obtain a fluid. The fluid was free of any shear thickening property. The fluid was heated to 55° C. 1 phr of a thermal initiator AIBN (on the basis of DMAA) was then added to the fluid, and the fluid was then heated to 90° C. and reacted at 90° C. for 1 hour to polymerize the DMAA. The product of the reaction was poured on an aluminum plate with a diameter of 7.56 mm. Because the product was not a shear thickening gel (STG), the impact test could not be performed. The composition of the product is shown in Table 1.

Comparative Example 4

12.0 g of alumina with an average diameter of 2 μm (AlO-010-Al, commercially available from FNAMI Co.) and 6.0 g of DMAA were stirred at room temperature for 3 hours to obtain a fluid. The fluid was free of any shear thickening property. The fluid was heated to 55° C. 1 phr of a thermal initiator AIBN (on the basis of DMAA) was then added to the fluid, and the fluid was then heated to 90° C. and reacted at 90° C. for 1 hour to polymerize the DMAA. The product of the reaction was poured on an aluminum plate with a diameter of 7.56 mm. Because the product was not a shear thickening gel (STG), the impact test could not be performed. The composition of the product is shown in Table 1.

Comparative Example 5

12.0 g of aluminum hydroxide with an average diameter of 1 μm (H-42M, commercially available from Showa Denko K.K.) and 6.0 g of DMAA were stirred at room temperature for 3 hours to obtain a fluid. The fluid was free of any shear thickening property. The fluid was heated to 55° C. 1 phr of a thermal initiator AIBN (on the basis of DMAA) was then added to the fluid, and the fluid was then heated to 90° C. and reacted at 90° C. for 1 hour to polymerize the DMAA. The product of the reaction was poured on an aluminum plate with a diameter of 7.56 mm. Because the product was not a shear thickening gel (STG), the impact test could not be performed. The composition of the product is shown in Table 1.

Comparative Example 6

A PBDMS protective material (D30 SixSix One Evo, knee protector) was tested by an impact test of BS EN 1621-1 standard, and the residual pressure after the impact test was evaluated by a Fuji Prescale MW pressure sensing paper (Model: MS, single sheet, Commercially available from MassTech Inc). The impact test result of the protective material is shown in Table 1.

Comparative Example 7

A thermosetting polyurethane protective material (G-form Sport Knee Pad Black, knee protector) was tested by an impact test of BS EN 1621-1 standard, and the residual pressure after the impact test was evaluated by a Fuji Prescale MW pressure sensing paper (Model: MS, single sheet, Commercially available from MassTech Inc). The impact test result of the protective material is shown in Table 1.

Comparative Example 8

A silicone gel sheet with a thickness of 3.3 mm (commercially available from Homytech Co., Ltd) was cut to a size of 9 cm$^2$, and then tested by an impact test of BS EN 1621-1 standard, and the residual pressure after the impact test was evaluated by a Fuji Prescale MW pressure sensing paper (Model: MS, single sheet, Commercially available from MassTech Inc). The impact test result of the protective material is shown in Table 1.

TABLE 1

(Impact test result of the protective materials)

| | Shear thickening fluid (STF) | | | | | Shear thickening gel (STG) | | |
|---|---|---|---|---|---|---|---|---|
| | Composition | | Viscosity property | | | Impact test result | | |
| | Silica (g) | DMAA (g) | Initial viscosity (cps) | Maximum viscosity (cps) | Shear rate ($s^{-1}$) | Thickness (mm) | Pressure (MPa) | Impact energy (J) |
| Example 1 | 10.0 | 6.0 | 122251 | 345711 | 3.11 | 2.0 | 36.50 | 4.656 |
| Example 2 | 12.0 | 6.0 | 33534 | 386624 | 3.11 | 2.0 | 35.87 | 4.575 |
| Example 3 | 13.5 | 6.0 | 169641 | 429582 | 3.11 | 2.0 | 36.00 | 4.592 |
| Example 4 | 24.0 | 12.0 | 33534 | 386624 | 3.11 | 4.0 | 30.67 | 3.912 |
| Comparative Example 1 | 7.2 | 6.0 | 7890 | — | — (Note 2) | 2.0 | — (Note 1) | — |
| Comparative Example 2 | 6 (Clay) | 35.29 | 132162 | — | — (Note 2) | — | — | — |
| Comparative Example 3 | 12 (Clay) | 6 | — | — | — (Note 2) | — | — | — |
| Comparative Example 4 | 12 (Alumina) | 6 | — | — | — (Note 2) | — | — | — |
| Comparative Example 5 | 12 (Aluminum hydroxide) | 6 | — | — | — (Note 2) | — | — | — |
| Comparative Example 6 (PBDMS/D3O) | — | — | — | — | — | 7.0 | — (Note 1) | — |
| Comparative Example 7 (Thermosetting Polyurethane/G-Form) | — | — | — | — | — | 8.0 | 37.50 | 4.783 |
| Comparative Example 8 (Silicone gel sheet) | — | — | — | — | — | 3.3 | 42.22 | 5.385 |

(Note 1):
Both the sample and the pressure sensing paper were broken.
(Note 2):
The impact test was not performed due to failure in forming STF or STG.

Example 5

16.0 g of silica with an average diameter of 500 nm (SO-E2 silica, commercially available from Denka Co.) and 6.0 g of DMAA were stirred at room temperature for 3 hours to obtain a shear thickening fluid. The shear thickening fluid had an initial viscosity of 45369 cps at 25° C., and a maximum viscosity of 342643 cps at a shear rate of 3.11 $s^{-1}$. The shear thickening fluid was heated to 55° C. 1 phr of a thermal initiator AIBN (on the basis of DMAA) was then added to the shear thickening fluid, and the shear thickening fluid was then heated to 90° C. and reacted at 90° C. for 1 hour to polymerize the DMAA. The product of the reaction was poured on an aluminum plate with a diameter of 7.56 mm, and then cooled to form a sample. The sample was tested by an impact test of BS EN 1621-1 standard, and the residual pressure after the impact test was evaluated by a Fuji Prescale MW pressure sensing paper (Model: MS, single sheet, Commercially available from MassTech Inc). The composition and the impact test result of the sample (protective material) are shown in Table 2.

Example 6

17.0 g of silica with an average diameter of 500 nm (SO-E2 silica, commercially available from Denka Co.) and 6.0 g of DMAA were stirred at room temperature for 3 hours to obtain a shear thickening fluid. The shear thickening fluid had an initial viscosity of 86793 cps at 25° C., and a maximum viscosity of 402478 cps at a shear rate of 3.11 $s^{-1}$. The shear thickening fluid was heated to 55° C. 1 phr of a thermal initiator AIBN (on the basis of DMAA) was then added to the shear thickening fluid, and the shear thickening fluid was then heated to 90° C. and reacted at 90° C. for 1 hour to polymerize the DMAA. The product of the reaction was poured on an aluminum plate with a diameter of 7.56 mm, and then cooled to form a sample. The sample was tested by an impact test of BS EN 1621-1 standard, and the residual pressure after the impact test was evaluated by a Fuji Prescale MW pressure sensing paper (Model: MS, single sheet, Commercially available from MassTech Inc). The composition and the impact test result of the sample (protective material) are shown in Table 2.

Example 7

17.0 g of silica with an average diameter of 3.4 µm (PLV-4 silica, commercially available from Tatsumori, Ltd.) and 6.0 g of DMAA were stirred at room temperature for 3 hours to obtain a shear thickening fluid. The shear thickening fluid had an initial viscosity of 72985 cps at 25° C., and a maximum viscosity of 344177 cps at a shear rate of 3.11 $s^{-1}$. The shear thickening fluid was heated to 55° C. 1 phr of a thermal initiator AIBN (on the basis of DMAA) was then added to the shear thickening fluid, and the shear thickening fluid was then heated to 90° C. and reacted at 90° C. for 1 hour to polymerize the DMAA. The product of the reaction was poured on an aluminum plate with a diameter of 7.56 mm, and then cooled to form a sample. The sample was tested by an impact test of BS EN 1621-1 standard, and the residual pressure after the impact test was evaluated by a Fuji Prescale MW pressure sensing paper (Model: MS, single sheet, Commercially available from MassTech Inc). The composition and the impact test result of the sample (protective material) are shown in Table 2.

Example 8

21.0 g of silica with an average diameter of 5.2 μm (PLV-6 silica, commercially available from Tatsumori, Ltd.) and 6.0 g of DMAA were stirred at room temperature for 3 hours to obtain a shear thickening fluid. The shear thickening fluid had an initial viscosity of 92711 cps at 25° C., and a maximum viscosity of 377419 cps at a shear rate of 3.11 s$^{-1}$. The shear thickening fluid was heated to 55° C. 1 phr of a thermal initiator AIBN (on the basis of DMAA) was then added to the shear thickening fluid, and the shear thickening fluid was then heated to 90° C. and reacted at 90° C. for 1 hour to polymerize the DMAA. The product of the reaction was poured on an aluminum plate with a diameter of 7.56 mm, and then cooled to form a sample. The sample was tested by an impact test of BS EN 1621-1 standard, and the residual pressure after the impact test was evaluated by a Fuji Prescale MW pressure sensing paper (Model: MS, single sheet, Commercially available from MassTech Inc). The composition and the impact test result of the sample (protective material) are shown in Table 2.

All the samples in Examples 1-8 had excellent impact resistance better than that in Comparative Examples 1-6 under same test conditions. When the STF was polymerized to form a protective material, which not only absorbed impact energy but also dissipated the impact energy and increased the area bearing the impact force for improving the protective properties. The samples in Examples 1-3 and 5-8 could provide a similar protective effect as the commercially available protector in Comparative Example 7, but the thickness of the formers were quarter of the thickness of the latter. The sample in Example 4 could provide a similar protective effect as the commercially available protector in Comparative Example 7, but the thickness of the former was only half of the thickness of the latter. In addition, the samples in Examples 1-8 had higher protective properties than that of the commercially available protectors in Comparative Examples 7 and 8.

Example 9

12.0 g of silica with a diameter of 2 μm to 3 μm (Megasil 550 silica, commercially available from Sibelco Asia Pte Ltd.—Bao Lin Branch), 5.4 g of DMAA, and 0.6 g of urethane diacrylate oligomer (DM 541, commercially available from DOUBLE BOND CHEMICAL IND., CO., LTD) were stirred at room temperature for 3 hours to obtain a shear thickening fluid. The shear thickening fluid had an initial viscosity of 74958 cps at 25° C., and a maximum viscosity of 382533 cps at a shear rate of 3.11 s$^{-1}$. The shear

TABLE 2

(Impact test result of the protective materials)

| | Shear thickening fluid (STF) | | | | Shear thickening gel (STG) | | |
|---|---|---|---|---|---|---|---|
| | Composition | | Viscosity property | | | Impact test result | |
| | Silica (g) | DMAA (g) | Initial viscosity (cps) | Maximum viscosity (cps) | Shear rate (s$^{-1}$) | Thickness (mm) | Pressure (MPa) | Impact energy (J) |
| Example 2 | 12.0 | 6.0 | 33534 | 386624 | 3.11 | 2.0 | 35.87 | 4.575 |
| Example 5 | 16.0 | 6.0 | 45369 | 342643 | 3.11 | 2.0 | 35.53 | 4.532 |
| Example 6 | 17.0 | 6.0 | 86793 | 402478 | 3.11 | 2.0 | 30.97 | 3.950 |
| Example 7 | 17.0 | 6.0 | 72985 | 344177 | 3.11 | 2.0 | 35.76 | 4.561 |
| Example 8 | 21.0 | 6.0 | 92711 | 377419 | 3.11 | 3.0 | 35.41 | 4.517 |
| Comparative Example 1 | 7.2 | 6.0 | 7890.29 | — | (Note 2) | 2.0 | (Note 1) | — |
| Comparative Example 2 | 6 (clay) | 35.29 | 132162 | — | (Note 2) | — | — | — |
| Comparative Example 3 | 12 (clay) | 6 | — | — | (Note 2) | — | — | — |
| Comparative Example 6 (PBDMS/D3O) | — | — | — | — | — | 7.0 | (Note 1) | — |
| Comparative Example 7 (Thermosetting Polyurethane/G-Form) | — | — | — | — | — | 8.0 | 37.50 | 4.783 |
| Comparative Example 8 (Silicone gel sheet) | — | — | — | — | — | 3.3 | 42.22 | 5.385 |

(Note 1):
Both the sample and the pressure sensing paper were broken.
(Note 2):
The impact test was not performed due to failure in forming STF or STG.

As shown in Tables 1 and 2, all the samples in Examples 1-8 had excellent shear thickening properties, such as having a viscosity over 300000 cps at a shear rate lower than 4 s$^{-1}$.

thickening fluid was heated to 55° C. 1 phr of a thermal initiator AIBN (on the basis of DMAA and DM 541) was then added to the shear thickening fluid, and the shear thickening fluid was then heated to 90° C. and reacted at 90° C. for 1 hour to polymerize the DMAA and DM 541. The product of the reaction was poured on an aluminum plate with a diameter of 7.56 mm, and then cooled to form a sample. The sample was tested by an impact test of BS EN 1621-1 standard, and the residual pressure after the impact test was evaluated by a Fuji Prescale MW pressure sensing paper (Model: MS, single sheet, Commercially available from MassTech Inc). The composition and the impact test result of the sample (protective material) are shown in Table 3.

Example 10

12.0 g of silica with a diameter of 2 μm to 3 μm (Megasil 550 silica, commercially available from Sibelco Asia Pte Ltd.—Bao Lin Branch), 4.9 g of DMAA, and 1.1 g of 2-ethylhexyl acrylate (2-EHA, commercially available from First Chemical Manufacture Co., Ltd.) were stirred at room temperature for 3 hours to obtain a shear thickening fluid. The shear thickening fluid had an initial viscosity of 126245 cps at 25° C., and a maximum viscosity of 393273 cps at a shear rate of 3.11 s$^{-1}$. The shear thickening fluid was heated to 55° C. 1 phr of a thermal initiator AIBN (on the basis of DMAA and 2-EHA) was then added to the shear thickening fluid, and the shear thickening fluid was then heated to 90° C. and reacted at 90° C. for 1 hour to polymerize the DMAA and 2-EHA. The product of the reaction was poured on an aluminum plate with a diameter of 7.56 mm, and then cooled to form a sample. The sample was tested by an impact test of BS EN 1621-1 standard, and the residual pressure after the impact test was evaluated by a Fuji Prescale MW pressure sensing paper (Model: MS, single sheet, Commercially available from MassTech Inc). The composition and the impact test result of the sample (protective material) are shown in Table 3.

Example 11

12.0 g of silica with a diameter of 2 μm to 3 μm (Megasil 550 silica, commercially available from Sibelco Asia Pte Ltd.—Bao Lin Branch), 4.5 g of DMAA, and 1.5 g of 2-hydroxyethyl acrylate (2-HEA, commercially available from First Chemical Manufacture Co., Ltd.) were stirred at room temperature for 3 hours to obtain a shear thickening fluid. The shear thickening fluid had an initial viscosity of 143468 cps at 25° C., and a maximum viscosity of 372816 cps at a shear rate of 3.11 s$^{-1}$. The shear thickening fluid was heated to 55° C. 1 phr of a thermal initiator AIBN (on the basis of DMAA and 2-HEA) was then added to the shear thickening fluid, and the shear thickening fluid was then heated to 90° C. and reacted at 90° C. for 1 hour to polymerize the DMAA and 2-HEA. The product of the reaction was poured on an aluminum plate with a diameter of 7.56 mm, and then cooled to form a sample. The sample was tested by an impact test of BS EN 1621-1 standard, and the residual pressure after the impact test was evaluated by a Fuji Prescale MW pressure sensing paper (Model: MS, single sheet, Commercially available from MassTech Inc). The composition and the impact test result of the sample (protective material) are shown in Table 3.

Comparative Example 9

12.0 g of silica with a diameter of 2 μm to 3 μm (Megasil 550 silica, commercially available from Sibelco Asia Pte Ltd.—Bao Lin Branch), 4.25 g of DMAA, and 1.75 g of DM 541 were stirred at room temperature for 3 hours to obtain a fluid. The fluid was free of any shear thickening property. The fluid was heated to 55° C. 1 phr of a thermal initiator AIBN (on the basis of DMAA and DM 541) was then added to the fluid, and the fluid was then heated to 90° C. and reacted at 90° C. for 1 hour to polymerize the DMAA and DM 541. The product of the reaction was poured on an aluminum plate with a diameter of 7.56 mm, and then cooled to form a sample. The sample was tested by an impact test of BS EN 1621-1 standard, and the residual pressure after the impact test was evaluated by a Fuji Prescale MW pressure sensing paper (Model: MS, single sheet, Commercially available from MassTech Inc). The composition and the impact test result of the sample (protective material) are shown in Table 3.

Comparative Example 10

12.0 g of silica with a diameter of 2 μm to 3 μm (Megasil 550 silica, commercially available from Sibelco Asia Pte Ltd.—Bao Lin Branch), 4.25 g of DMAA, and 1.75 g of 2-EHA were stirred at room temperature for 3 hours to obtain a fluid. The fluid was free of any shear thickening property. The fluid was heated to 55° C. 1 phr of a thermal initiator AIBN (on the basis of DMAA and 2-EHA) was then added to the fluid, and the fluid was then heated to 90° C. and reacted at 90° C. for 1 hour to polymerize the DMAA and 2-EHA. The product of the reaction was poured on an aluminum plate with a diameter of 7.56 mm. Because the product was not a shear thickening gel (STG), the impact test could not be performed. The composition of the product is shown in Table 3.

Comparative Example 11

12.0 g of silica with a diameter of 2 μm to 3 μm (Megasil 550 silica, commercially available from Sibelco Asia Pte Ltd.—Bao Lin Branch), 4.25 g of DMAA, and 1.75 g of 2-HEA were stirred at room temperature for 3 hours to obtain a fluid. The fluid was free of any shear thickening property. The fluid was heated to 55° C. 1 phr of a thermal initiator AIBN (on the basis of DMAA and 2-HEA) was then added to the fluid, and the fluid was then heated to 90° C. and reacted at 90° C. for 1 hour to polymerize the DMAA and 2-HEA. The product of the reaction was poured on an aluminum plate with a diameter of 7.56 mm. Because the product was not a shear thickening gel (STG), the impact test could not be performed. The composition of the product is shown in Table 3.

TABLE 3

(Impact test result of the protective materials)

| | Shear thickening fluid (STF) | | | | | | | Shear thickening gel (STG) | | |
| --- | --- | --- | --- | --- | --- | --- | --- | --- | --- | --- |
| | Composition | | | | Viscosity property | | | | Impact test result | |
| | Silica (g) | DMAA (g) | Acrylate monomer (g) | Monomer ratio | Initial viscosity (cps) | Maximum viscosity (cps) | Shear rate (s$^{-1}$) | Thickness (mm) | Pressure (MPa) | Impact energy (J) |
| Example 2 | 12.0 | 6.0 | — | 0 | 33534 | 386624 | 3.11 | 2.0 | 35.87 | 4.575 |
| Example 9 | 12.0 | 5.4 | 0.6 (DM 541) | 9 | 74958 | 382533 | 3.11 | 2.0 | 33.74 | 4.304 |

TABLE 3-continued (Impact test result of the protective materials)

| | Shear thickening fluid (STF) | | | | | | Shear thickening gel (STG) | | |
|---|---|---|---|---|---|---|---|---|---|
| | Composition | | | | Viscosity property | | | Impact test result | |
| | Silica (g) | DMAA (g) | Acrylate monomer (g) | Monomer ratio | Initial viscosity (cps) | Maximum viscosity (cps) | Shear rate ($s^{-1}$) | Thickness (mm) | Pressure (MPa) | Impact energy (J) |
| Example 10 | 12.0 | 4.9 | 1.1 (2-EHA) | 4.45 | 126245 | 393272 | 3.11 | 2.0 | 33.88 | 4.321 |
| Example 11 | 12.0 | 4.5 | 1.5 (2-HEA) | 3 | 143458 | 372816 | 3.11 | 2.0 | 33.63 | 4.290 |
| Comparative Example 9 | 12.0 | 4.25 | 1.75 (DM 541) | 2.43 | 1739808 | — (Note 2) | — | 2.0 | — (Note 1) | — |
| Comparative Example 10 | 12.0 | 4.25 | 1.75 (2-EHA) | 2.43 | — | — | — (Note 2) | — | — | — |
| Comparative Example 11 | 12.0 | 4.25 | 1.75 (HEA) | 2.43 | — | — | — (Note 2) | — | — | — |
| Comparative Example 6 (PBDMS/D3O) | — | — | — | — | — | — | — | 7.0 | — (Note 1) | — |
| Comparative Example 7 (Thermosetting Polyurethane/G-Form) | — | — | — | — | — | — | — | 8.0 | 37.50 | 4.783 |

(Note 1):
Both the sample and the pressure sensing paper were broken.
(Note 2):
The impact test was not performed due to failure in forming STF or STG.

As shown in Table 3, all the samples in Examples 9-11 had excellent impact resistance better than that in Comparative Examples 7-9 under same test conditions. When the STF was polymerized to form a protective material, which not only absorbed impact energy but also dissipated the impact energy and increased the area bearing the impact force for improving the protective properties. The samples in Examples 2, 9, 10, and 11 could provide a similar protective effect as the commercially available protector in Comparative Example 7, but the thickness of the formers were only quarter of the thickness of the latter. In addition, the samples in Examples 2, 9, 10, and 11 had higher protective properties than that of the commercially available protectors in Comparative Examples 7 and 8. The protective materials in Examples having properties such as thin-shape, energy absorption, and impact resistance were obviously superior to the general protective materials in Comparative Examples.

Example 12

A Twaron cross woven fabric (CC714 WRT, 190 g/m², commercially available from Teijin Aramid Co., Ltd.) was impregnated in the shear thickening fluid (STF) in Example 2, and the STF was then cured. As such, the Twron cross woven fabric was wrapped in the protective material in Example 2. The sample was tested by an impact test of BS EN 1621-1 standard, and the residual pressure after the impact test was evaluated by a Fuji Prescale MW pressure sensing paper (Model: MS, single sheet, Commercially available from MassTech Inc). The composition and the impact test result of the sample (protective material) are shown in Table 4.

Example 13

The cured product in Example 2 was cut to a circular sample with a diameter of 6 mm, and then put on a disc groove of TPU (EL96, 90 kg/m³, commercially available from Chiao Fu Enterprise Co., Ltd.) in Comparative Example 12. The sample was tested by an impact test of BS EN 1621-1 standard, and the residual pressure after the impact test was evaluated by a Fuji Prescale MW pressure sensing paper (Model: MS, single sheet, Commercially available from MassTech Inc). The composition and the impact test result of the sample (protective material) are shown in Table 4.

Comparative Example 12

An inert foam TPU (EL96, 90 kg/m³, commercially available from Chiao Fu Enterprise Co., Ltd.) was pressed to form a hive-shaped disc groove with a diameter of 6 mm. The sample was tested by an impact test of BS EN 1621-1 standard, and the residual pressure after the impact test was evaluated by a Fuji Prescale MW pressure sensing paper (Model: MS, single sheet, Commercially available from MassTech Inc). The composition and the impact test result of the sample (protective material) are shown in Table 4.

TABLE 4

(Impact test result of the protective materials)

| | Shear thickening fluid(STF) | | Protective structure (Shear thickening gel (STG)) | | |
|---|---|---|---|---|---|
| | Composition | | | Impact result | |
| | Silica (g) | DMAA (g) | Composite film | Thickness (mm) | Pressure (MPa) | Impact energy (J) |
| Example 12 (Bullet proof fabric/STG) | 12.0 | 6.0 | Twaron CT714 WRT impregnated in STG | 2.5 | 36.20 | 4.617 |
| Example 13 (TPU foam/STG) | 12.0 | 6.0 | TPU under STG (diameter of 6 mm) | 5.2 | 36.77 | 4.690 |
| Comparative Example 12 (TPU foam) | — | — | — | 5.1 | Fail (Note 1) | Fail |

(Note 1):
Both the sample and the pressure sensing paper were broken.

As shown in Table 4, Examples 12 and 13 still had a higher impact energy absorption and protective effect. Especially, when the protective material in Example 2 was loaded on the TPU foam in Comparative Example 12, the energy dissipation properties was dramatically enhanced 20%.

It will be apparent to those skilled in the art that various modifications and variations can be made to the disclosed methods and materials. It is intended that the specification and examples be considered as exemplary only, with a true scope of the disclosure being indicated by the following claims and their equivalents.

What is claimed is:

1. A protective material, comprising:
a polymer polymerized from a monomer, wherein the monomer is acrylamide monomer with a formula of

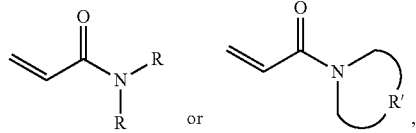

wherein each R is independently $C_{1-3}$ alkyl group, and R' is $C_{2-5}$ alkylene group; and
a plurality of silica particles,
wherein the silica particles and the polymer have a weight ratio of 1.5:1 to 4:1.

2. The protective material as claimed in claim 1, wherein the polymer has a weight average molecular weight of 1000 to 50000.

3. The protective material as claimed in claim 1, wherein the silica particles have a ball shape or an irregular shape.

4. The protective material as claimed in claim 1, wherein the silica particles have a size of 50 nm to 1 mm.

5. A protective material, comprising:
a polymer polymerized from monomers, wherein the monomers are (1) acrylamide monomer and (2) acrylate monomer or acrylate oligomer, wherein the (1) acrylamide monomer has a formula of

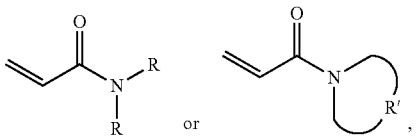

wherein each R is independently H or $C_{1-3}$ alkyl group, and R' is $C_{2-5}$ alkylene group; and
a plurality of silica particles,
wherein the silica particles and the polymer have a weight ratio of 1.5:1 to 4:1,
wherein the (1) acrylamide monomer and the (2) acrylate monomer or acrylate oligomer have a weight ratio greater than or equal to 2.5,
wherein the (2) acrylate monomer or acrylate oligomer is urethane diacrylate oligomer, isooctyl acrylate, hydroxyethyl acrylate, or a combination thereof.

6. A protective structure, comprising:
a protective material; and
a substrate impregnated in the protective material or disposed under the protective material;
wherein the protective material comprises:
a polymer polymerized from a monomer, wherein the monomer includes acrylamide monomer with a formula of

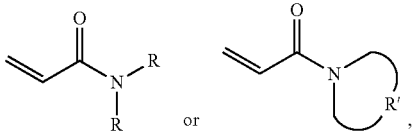

wherein each R is independently H or $C_{1-3}$ alkyl group, and R' is $C_{2-5}$ alkylene group; and
a plurality of silica particles,
wherein the silica particles and the polymer have a weight ratio of 1.5:1 to 4:1.

7. The protective structure as claimed in claim 6, wherein the substrate comprises fiber, foam, coating, or metal foil.

8. The protective structure as claimed in claim 6, having a thickness of 1 mm to 5 mm.

9. The protective structure as claimed in claim 6, wherein the polymer has a weight average molecular weight of 1000 to 50000.

10. The protective structure as claimed in claim 6, wherein the monomer further comprises acrylate monomer or acrylate oligomer, and the acrylamide monomer and the acrylate monomer or acrylate oligomer have a weight ratio greater than or equal to 2.5.

11. The protective structure as claimed in claim 6, wherein the silica particles have a ball shape or an irregular shape.

12. The protective structure as claimed in claim 6, wherein the silica particles have a size of 50 nm to 1 mm.

13. A protective method, comprising:
putting a protective structure on an object for dissipating a force in the protective material, wherein the force is initially applied to the object,
wherein the protective structure comprises:
a protective material; and
a substrate impregnated in the protective material or disposed under the protective material;
wherein the protective material comprises:
a polymer polymerized from a monomer, wherein the monomer includes acrylamide monomer with a formula of

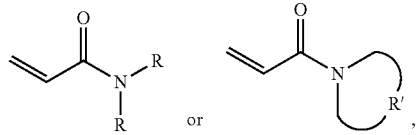

wherein each R is independently H or $C_{1-3}$ alkyl group, and R' is $C_{2-5}$ alkylene group; and
a plurality of silica particles,
wherein the silica particles and the polymer have a weight ratio of 1.5:1 to 4:1.

14. The method as claimed in claim 13, wherein the substrate comprises fiber, foam, coating, or metal foil.

15. The method as claimed in claim 13, wherein the protective structure has a thickness of 1 mm to 5 mm.

16. The method as claimed in claim 13, wherein the polymer has a weight average molecular weight of 1000 to 50000.

17. The method as claimed in claim 13, wherein the monomer further comprises acrylate monomer or acrylate oligomer, and the acrylamide monomer and the acrylate monomer or acrylate oligomer have a weight ratio greater than or equal to 2.5.

18. The method as claimed in claim 13, wherein the silica particles have a ball shape or an irregular shape.

19. The method as claimed in claim 13, wherein the silica particles have a size of 50 nm to 1 mm.

20. The method as claimed in claim 13, wherein the object is a human body, and the force initially applied to the object comes from a bullet fired from a firearm.

* * * * *